United States Patent Office 3,711,367
Patented Jan. 16, 1973

3,711,367
SCREENING DEVICE IN CELLULOSE DIGESTERS
Per Tyke Christenson, Karlstad, Sweden, assignor to Kamyr Aktiebolag, Karlstad, Sweden
Filed Feb. 9, 1971, Ser. No. 113,962
Claims priority, application Sweden, Feb. 11, 1970, 1,734/70
Int. Cl. B01d 29/36
U.S. Cl. 162—251                           9 Claims

ABSTRACT OF THE DISCLOSURE

A filtrate chamber back of a cylindrical screen girdle inserted in a cellulose digester is divided by vertical partitions into compartments. An internal manifold or header located axially adjacent and coaxial to said filtrate chamber communicates with said compartments through narrow apertures. A second similar manifold may be provided on the other side of the screen girdle, the filtrate chamber compartments being alternately connected to the lower and the upper manifold.

The invention relates to a screening device for separation of liquid from fibrous material in an upright cylindrical cellulose digester wherein the screening device comprises a cylindrical screen girdle and a filtrate chamber located between said screen girdle and a cylindrical portion of the digester shell, said chamber being divided by means of vertical partitions into a number of compartments.

In order to have the screening effect distributed as uniformly as possible around the circumference of the digester it is usual to carry off the liquid, usually digesting liquor, collected in the compartments of the filtrate chamber, through several outlets leading through the digester shell and communicating with a manifold located outside the digester and extending around the same.

The object of the present invention is to collect and carry off the filtrate from the screen girdle in a manner which is simpler in design and operatively more advantageous than in the known arrangement.

The essential characterizing feature of the invention whereby said object is obtained, consists in that a manifold or header for collecting the filtrate is provided around the inner side of the digester shell and located adjacent to said filtrate chamber, said manifold being connected to three or more of said compartments and having a single outlet or not more than two outlets extending through the digester shell. By having filtrate currents from several compartments of said chamber coalesce already inside the digester, the tubular connections will be simplified, among others because these connections—in contrast to the usual arrangement with a manifold outside the digester—need not withstand high hydraulic pressure, nor be heat-insulated. By placing the internal manifold or header axially adjacent to the filtrate chamber and on the same radius as the latter, no additional space in the radial direction is required, but the screen girdle can be placed as close to the digester shell as in earlier arrangements where an external filtrate manifold was used.

Figure 1:
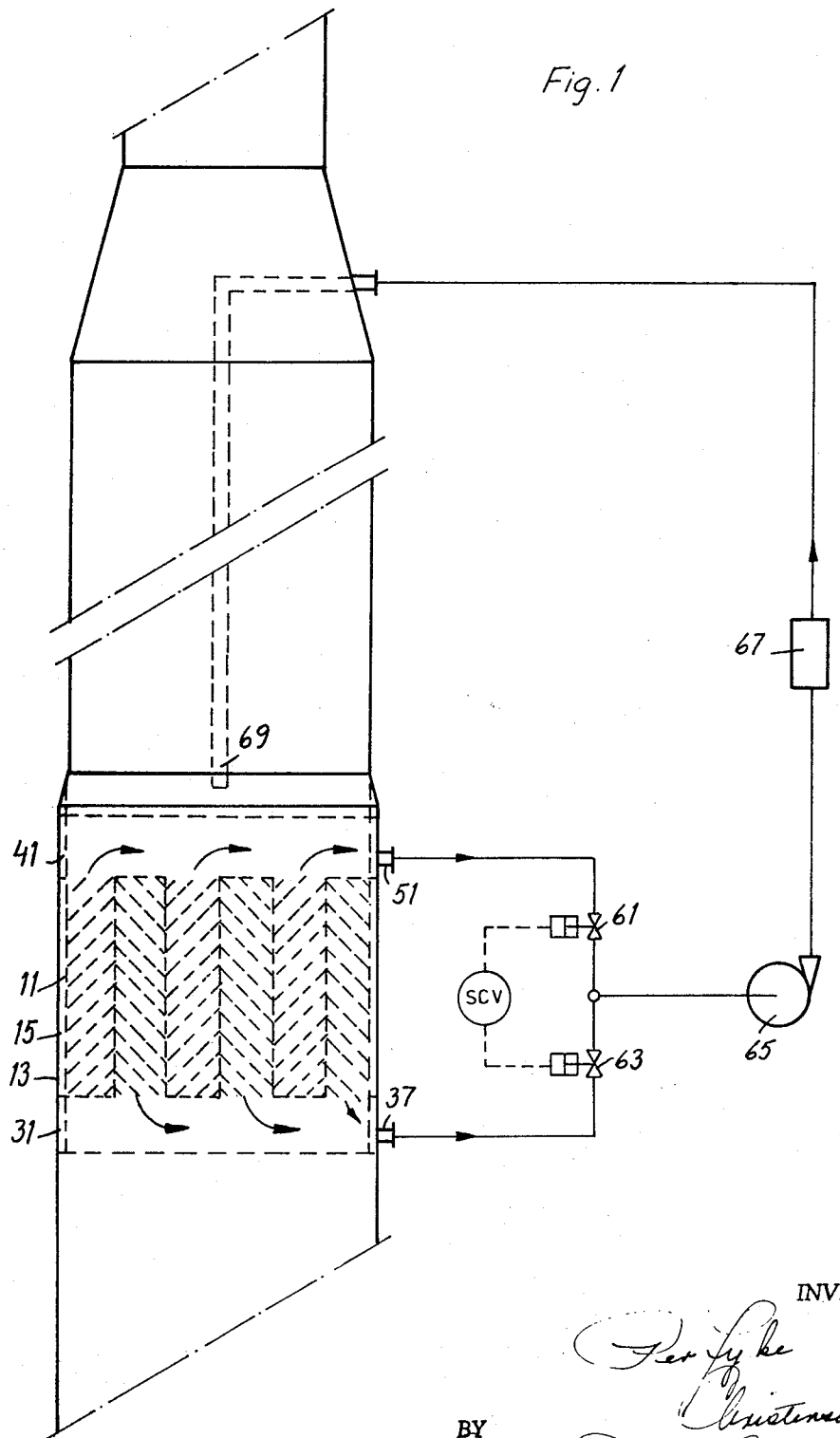
Figure 2:
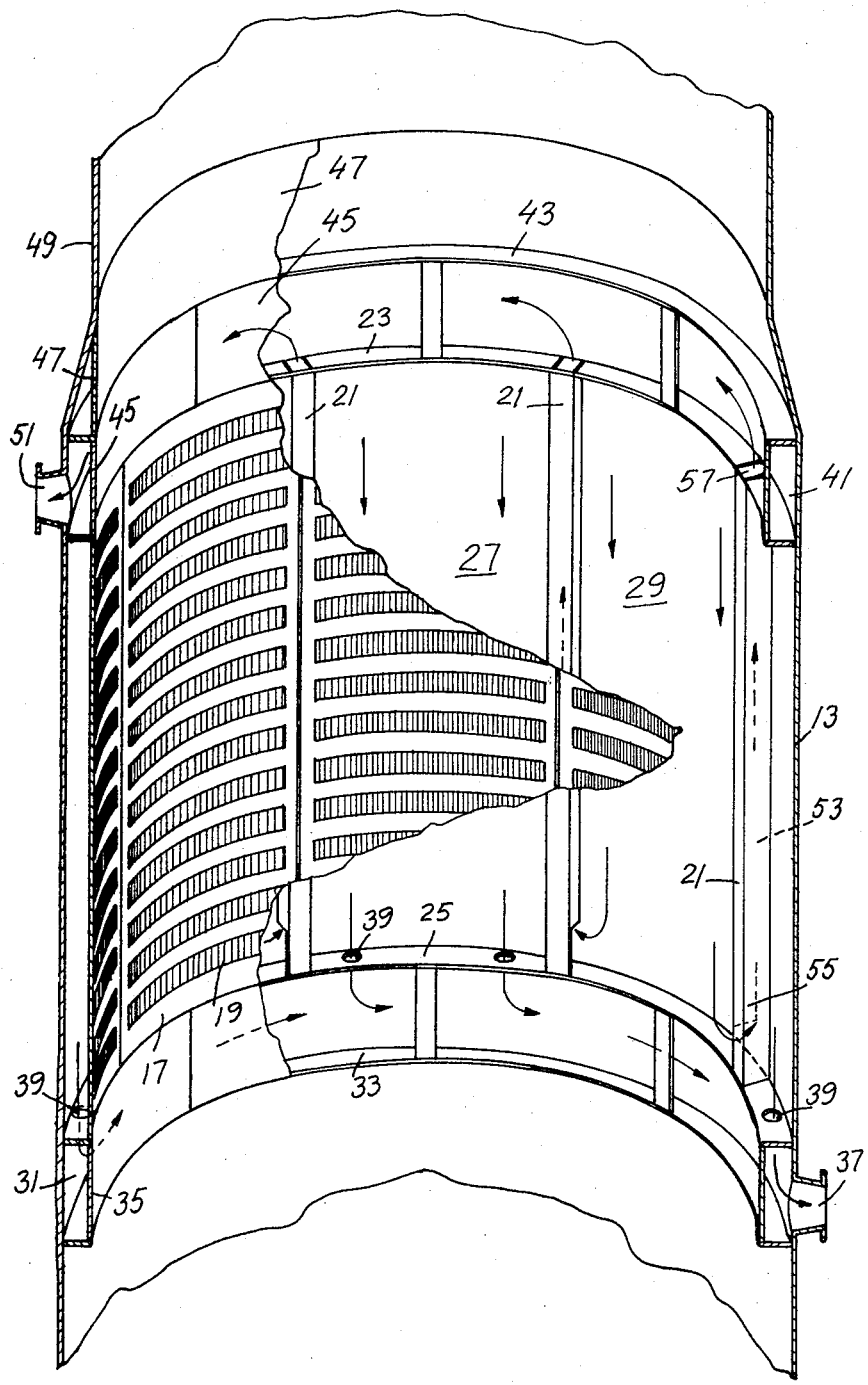

The invention will be more closely described herein below with reference to the accompanying drawings, in which FIG. 1 is a diagrammatical general view of a digester equipped with a screening device according to the invention, and FIG. 2 is a detailed perspective view of the screening device.

FIG. 1 shows a section of a continuous cellulose digester adapted for digestion of wood chips or other fibrous cellulosic material. Said material is continuously supplied to the top of the digester and is passed together with a suitable digesting liquor, such as sulphate or sulphite liquor, in the shape of a coherent column downwardly through various treating zones in the digester, such as impregnating, digesting and washing zones. In the shown section of the digester, heating of the fibrous material to digesting temperature takes place by withdrawing digesting liquor from the digester, heating the same in an outer circulation loop and returning the heated liquor to the digester.

The digesting liquor is withdrawn by means of a cylindrical screen girdle 11 arranged concentrically to a cylindrical portion 13 of the digester shell and of a somewhat smaller radius than the latter, so that an intermediate filtrate chamber 15 is formed. The screen girdle is composed of a number of sector-shaped screen plates 17 having vertical screening slits 19 arranged close together in horizontal rows. The screen plates are supported by and attached to a grid or framework of supporting members attached to the digester shell 13. The vertical straight edges of the screen plates are attached to vertical supporting posts 21, their upper edges are attached to an upper horizontal annular supporting plate or web 23, and their lower edges are attached to a lower horizontal annular supporting plate or web 25. Said supporting members form partitions dividing the filtrate chamber 15 into a number of compartments 27, 29 etc. separated from each other. According to FIG. 2, the number of screen plates and pertaining filtrate chamber compartments back thereof is equal to 8, but usually said number is greater, e.g. 12 or 16.

According to the invention, a main collection conduit, manifold or header 31 for filtrate is formed at the inside of the digester wall 13 and as an axial extension of the compartmented filtrate chamber 15. The upper border of said manifold is formed by the annular web or supporting plate 25 and the lower border by a similar web or annular supporting plate 33. In the inward radial direction the manifold 31 is closed by a cylindrical plate 35 which is concentric to and flush with the screen girdle 11 so that the moving fiber material column can slide past the same without being checked. Connected to the manifold 31 is an outlet 37 extending through the digester shell and adapted for the connection of a filtrate discharge conduit thereto. The manifold 31 communicates with compartments of the filtrate chamber on account of the web 25 being broken through in spaced places, such as by one or more apertures 39 for each connected compartment. Said apertures form separate choked connections between the compartments of the screen chamber and the manifold. The size of the apertures is such that the resistance offered to the flow of filtrate therethrough is many times greater than the flow resistance that the filtrate then encounters in the manifold during its flow to the outlet 37. The effect thereof is that the screening action is more uniformly distributed around the circumference of the digester. Apertures 39 lying close to the outlet 37 may be made narrower than apertures farther away therefrom, in order to compensate for the different lengths of the paths in the manifold taken by filtrate emanating from the various compartments of the filtrate chambers.

All compartments may be connected to the manifold just described, but in the embodiment shown in FIG. 2 merely every second compartment is connected to the manifold 31, whereas the remaining compartments are connected to an upper manifold 41 of a similar design as the manifold 31. Said manifold or header 41 likewise is formed by the digester shell 13, the upper annular supporting plate or web 23, a similar annular horizontal supporting plate or web 43 above the former, and a cylindrical plate 45 concentric to and flush with the upper edge of the screen girdle 11. A cylindrical plate 47 provides an almost imperceptible transition between the plate 45 and the adjacent upper portion 49 of the digester shell which is of a reduced diameter relatively the digester portion 13. The upper manifold 41 is connected to an outlet 51 extending through the digester shell.

Those compartments of the filtrate chamber from which filtrate should be carried off through the upper manifold 41 communicate with the same by way of conduits or passages having orifices in the lower portions of the compartments, the object thereof being to maintain a heavy flow there so as to prevent the clogging by deposited fibers. According to FIG. 2, each such conduit or passage 53 is formed in one of the vertical supporting posts 21 and has a lower orifice 55 and an upper orifice 57. Preferably, such a passage is provided at both sides of each compartment from which filtrate flows to the upper manifold 41.

As shown in the drawing, the compartments of the filtrate chamber are alternately connected to the lower and the upper manifold. On account thereof it is possible to use merely every second screen plate 17 of the screen girdle for screening off liquid during a certain time period, viz when one of the outlets 37, 51 is shut off. No pressure difference is present between the fore and back sides of screen plates connected to closed outlet, and therefore the fiber material can easily slide past said screen plates and carry with it such fibers as have stuck in the screening slits during a previous screening period, thus cleaning the same. By means of the valves 61, 63 (FIG. 1) a switching operation can be performed, so that during successive time periods the active and the inactive sectors of the screen girdle are interchanged. The liquor screened off is driven by a pump 65 through a heat exchanging apparatus 67, and the heated liquor is sent back to the digester through a tube 69 suspended centrally therein. Irrespective of which of the valves 61, 63 is open, withdrawal of liquor will take place at the same level of the digester, so that the motion of the fiber material column and the temperature distribution in the digester will not be influenced when the active and inactive screen sectors are exchanged. On account of the screening effect being divided upon a number of simultaneously operating sectors distributed around the circumference of the digester and periodically exchanged, there is also obtained an even temperature distribution in horizontal cross-sections to the fiber material column.

In cases where the screen girdle can be allowed to be shut off in its entirety during certain time intervals or when it need not be shut off at all, the compartments of the screen girdle may all be connected to a single manifold or header inside the digester, and a single outlet therefrom will do. In certain cases, however, it may be desirable to connect two outlets which preferably are located diametrically opposite to each other, to the manifold, or to each manifold when two of them are present. As mentioned, the number of compartments of the filtrate chamber may vary. According to the invention always at least three compartments are connected to one or the same manifold, but usually the number is considerably greater. Finally it should be observed that the described screening device can be used also for the withdrawal of black liquor or washing liquid from a cellulose digester, and that it is applicable generally to the separation of liquids from a moving mass of fibrous material.

What is claimed is:

1. In an upright cellulose digester including a digester shell having a cylindrical portion therein, a screening device for separation of liquid from fibrous material being processed in said digester, said device comprising a cylindrical screen girdle and a filtrate chamber located between said screen girdle and the cylindrical portion of the digester shell, said chamber being divided by means of vertical partitions into a number of compartments, a pair of manifolds extending around the inside of said digester shell, each of said manifolds being connected to different compartments of said filtrate chamber to receive liquid therefrom, and separate outlet means extending through said shell to discharge liquid from each of said manifolds.

2. A digester according to claim 1 wherein the manifolds are positioned at the top and bottom of the screen girdle, the compartments of the filtrate chamber being alternately connected to said manifolds.

3. A digester according to claim 2 wherein the connections between compartments of the filtrate chamber and the top manifold are formed by passages having an orifice at the bottom of the respective compartment.

4. A digester according to claim 3 wherein said passages are associated with the vertical partitions between the compartments.

5. A digester according to claim 1 including a horizontal annular plate between said screen girdle and said shell supporting said screen girdle and constituting a wall of one of said manifolds.

6. A digester according to claim 5 wherein the manifold is defined by said horizontal supporting plate, an annular cylindrical plate member of the same radius as the screen girdle and the inside of the shell.

7. A digester according to claim 6 wherein said horizontal supporting plate is provided with apertures forming individual connections between the manifold and every other compartment of the filtrate chamber.

8. A digester according to claim 7 wherein each of the connections between the filtrate chamber compartments and the manifold is choked such that the filtrate encounters in said choked connection a flow resistance greater than the flow resistance encountered by the filtrate during its flow in the manifold.

9. A digester according to claim 6 wherein one manifold is positioned annularly around the inside of the shell adjacent the top of the screening device and the other manifold is positioned annularly around the inside of the shell adjacent the bottom of the screening device, each manifold being defined by an annular horizontal plate between the screen girdle and the shell, the shell wall, an annular impervious plate of the same radius as the screen girdle and joined thereto and a further horizontal plate parallel to the first such plate extending from the annular plate to the shell, one of said manifolds communicating with alternate compartments of said filtrate chamber and the other of said manifolds communicating with the rest of said compartments.

References Cited

UNITED STATES PATENTS

| 3,385,753 | 5/1968 | Rich | 162—251 |
| 439,033 | 10/1890 | Forbes | 162—251 X |
| 2,680,684 | 6/1954 | Obenshain | 162—251 X |

FOREIGN PATENTS 128,211  5/1950  Sweden.

JOHN ADEE, Primary Examiner

U.S. Cl. X.R.

210—340, 418